United States Patent
Kishihara et al.

(10) Patent No.: US 9,782,819 B2
(45) Date of Patent: Oct. 10, 2017

(54) SPIRAL SPRING MANUFACTURING METHOD

(71) Applicant: SUNCALL CORPORATION, Kyoto-shi (JP)

(72) Inventors: Ryuji Kishihara, Kyoto (JP); Naoya Wada, Kyoto (JP); Keiichiro Teratoko, Kyoto (JP)

(73) Assignee: Suncall Corporation, Kyoto (JP)

( * ) Notice: Subject to any disclaimer, the term of this patent is extended or adjusted under 35 U.S.C. 154(b) by 309 days.

(21) Appl. No.: 14/436,794

(22) PCT Filed: Nov. 20, 2013

(86) PCT No.: PCT/JP2013/081239
§ 371 (c)(1),
(2) Date: Apr. 17, 2015

(87) PCT Pub. No.: WO2014/091891
PCT Pub. Date: Jun. 19, 2014

(65) Prior Publication Data
US 2016/0167106 A1   Jun. 16, 2016

(30) Foreign Application Priority Data

Dec. 14, 2012   (JP) ................................ 2012-272912

(51) Int. Cl.
*B21F 3/08*   (2006.01)
*B21D 11/07*   (2006.01)
(Continued)

(52) U.S. Cl.
CPC ................ *B21F 3/08* (2013.01); *B21D 11/07* (2013.01); *B21F 23/00* (2013.01); *B21F 35/02* (2013.01);
(Continued)

(58) Field of Classification Search
CPC .......... B21D 11/06; B21D 11/16; B21F 3/00; B21F 3/08; B21F 3/10; B21F 23/00;
(Continued)

(56) References Cited

U.S. PATENT DOCUMENTS

| 2,503,149 A | * | 4/1950 | Bonnemort | ............... F16F 1/10 267/155 |
| 4,184,350 A | * | 1/1980 | Horwitt | ..................... B21F 3/08 72/132 |

(Continued)

FOREIGN PATENT DOCUMENTS

| DE | 943 288 C | 5/1956 |
| DE | 24 10 898 A1 | 9/1975 |

(Continued)

OTHER PUBLICATIONS

Microfilm of the specification and drawings annexed to the request of Japanese Utility Model Application No. 111727/1986 (Laid-open N. 18640/1988); Chuo Spring Co., Ltd. Feb. 6, 1988; claim 1; fig 1 (Family: none).

(Continued)

*Primary Examiner* — Sarang Afzali
(74) *Attorney, Agent, or Firm* — Sterne, Kessler, Goldstein & Fox P.L.L.C.

(57) ABSTRACT

A method includes a spiral forming step causing a substantially linear elongated member, conveyed toward one side in a longitudinal direction of the elongated member by a pair of conveying rollers, to be engaged at one side in a second direction with a pressing member movable in the second direction so that a spiral body including the fixed coil part, the first movable coil part and the second movable coil part is formed from the linear elongated member. The spiral forming step is configured to control the position of the pressing member with respect to the second direction, based on a signal from a rotational speed sensor detecting the rotational speed of the conveying roller, a relationship between a position in the longitudinal direction of the elongated member that is engaged with the pressing member (Continued)

and the position in the circumferential direction after the spiral body is formed.

4 Claims, 11 Drawing Sheets

(51) Int. Cl.
    *B21F 23/00*     (2006.01)
    *B21F 35/02*     (2006.01)
    *F16F 1/10*     (2006.01)

(52) U.S. Cl.
    CPC ............ *F16F 1/10* (2013.01); *F16F 2226/04* (2013.01); *F16F 2238/026* (2013.01); *Y10T 29/49611* (2015.01)

(58) Field of Classification Search
    CPC .. B21F 11/00; B21F 3/04; B21F 35/00; B21F 35/02; B23P 19/048; B23P 2015/0057; B21C 47/02; B21C 47/04; B21C 47/26; F16F 2226/04; F16F 1/10; F16F 2234/06; F16F 2238/026; Y10T 29/49071; Y10T 29/49609; Y10T 29/49611; B21B 2015/0057
    See application file for complete search history.

(56) References Cited

U.S. PATENT DOCUMENTS 4,571,973 A * 2/1986 Morita ...................... B21F 3/10
                                                        72/137

8,651,077 B2 * 2/2014 Matsunaga ............. F01L 1/344
                                                     123/90.15
8,656,876 B2 * 2/2014 Fujiyoshi .............. F01L 1/3442
                                                     123/90.15
8,667,825 B2 * 3/2014 Eto .......................... B21F 3/04
                                                     140/71 C
9,400,026 B2 * 7/2016 Kishihara ................ F16F 1/10
2013/0036992 A1 * 2/2013 Iwai ........................ F01L 9/02
                                                     123/90.12

FOREIGN PATENT DOCUMENTS

| JP | 5-76949 A | 3/1993 |
| --- | --- | --- |
| JP | 9-206866 A | 8/1997 |
| JP | 10-216879 A | 8/1998 |
| JP | 2009-190059 A | 8/2009 |
| JP | 2010-180862 A | 8/2010 |
| JP | 2013-92098 A | 5/2013 |

OTHER PUBLICATIONS

International Search Report based on PCT/JP2013/081239 mailed Feb. 10, 2014.

Extended European Search Report for European Application No. 13863522.2, dated Feb. 22, 2016 (8 pp.).

Notification of Transmittal of Translation of the International Preliminary Report on Patentability (Chapter I or II) based on International Application No. PCT/JP2013/081239 mailed Jun. 25, 2015 (6 pp.).

* cited by examiner

SPIRAL SPRING MANUFACTURING METHOD

BACKGROUND OF THE INVENTION

Field of the Invention

The present invention relates to a method for manufacturing a spiral spring.

Background Art

Spiral springs are widely used in various applications such as a valve timing adjuster for rotationally driving a cam shaft by rotative power inputted from the crankshaft in an internal combustion engine.

The valve timing adjuster includes a housing operatively connected to the crankshaft and a vane rotor operatively connected to the cam shaft, the internal space of the housing is divided into a retard chamber and an advance chamber by vanes in the vane rotor, and supplying hydraulic oil to one of the retard chamber and the advance chamber and discharging hydraulic oil from the other make it possible to change the rotational phase of the vane rotor relative to the housing.

The valve timing adjuster further includes a spiral spring for enhancing the startability of an internal combustion engine by retaining the rotational phase of the vane rotor relative to the housing at an intermediate phase between the most retarded position and the most advanced position.

The spiral spring is interposed between the housing and the vane rotor so as to be capable of biasing the vane rotor toward the intermediate phase on the advance side when the vane rotor is placed more toward the retard side than the intermediate phase is, and thereby the rotational movement of the vane rotor at the start of the internal combustion engine is retained at the intermediate phase so that the startability of the internal combustion engine can be enhanced.

The spiral spring is a member obtained by spirally winding an elongated wire rod in approximately the same plane and arrives at an elasticity retaining state by the relative circumferential movement of the inner end and the outer end in the diameter-reducing direction.

Figure 9A:
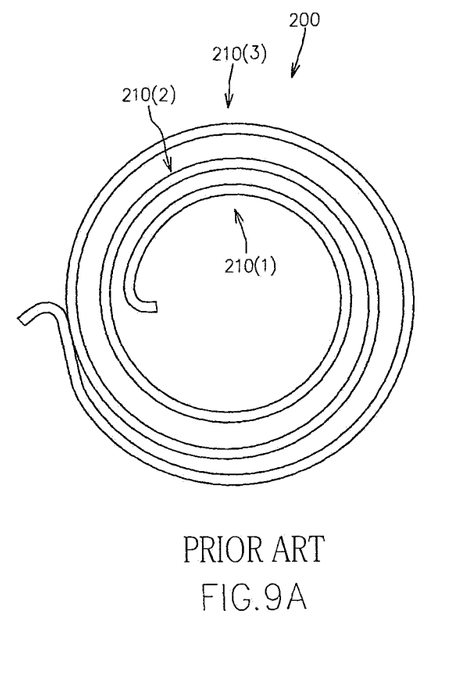
FIGS. 9A to 9C are plan views of a conventional spiral spring, and show a free length state, an initial torque generating state and a maximum torque generating state, respectively.
Figure 9B:
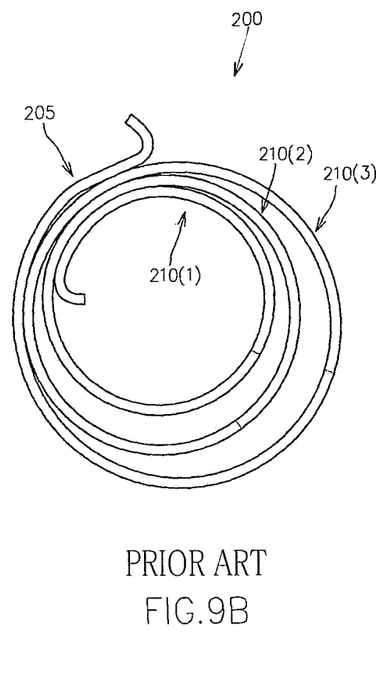
Figure 9C:
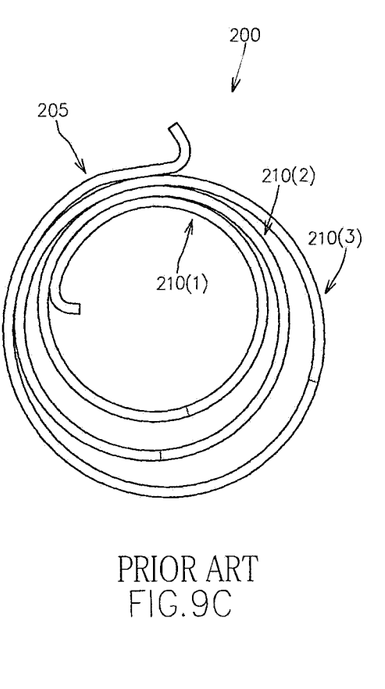

FIGS. 9A to 9C show plan views of a conventional spiral spring.

FIGS. 9A to 9C show a free length state, an initial torque generating state (a state in which the spiral spring is elastically deformed in the diameter-reducing direction from the free length state so as to generate a predetermined initial torque), and a maximum torque generating state (a state in which the spiral spring is elastically deformed in the diameter-reducing direction from the initial torque generating state so as to generate the maximum torque) of the spiral spring, respectively.

As shown in FIG. 9A, in a free length state, a conventional spiral spring is configured such that the radius of curvature is increased at an approximately constant rate from the inner end that is located radially inside toward the outer end that is located radially outside (the radius is increased at an approximately constant rate).

As shown in FIGS. 9B and 9C, when a conventional spiral spring having this configuration is brought into an elasticity retaining state such as the initial torque generating state or the maximum torque generating state, all coil parts ranging from the first coil part in the innermost place to the n-th coil part in the outermost place in the radial direction (the third coil part in the configuration depicted in the drawings) come into contact with other radially adjacent coil parts only in one location that is approximately the same position with respect to the circumferential direction (hereinafter referred to as a first circumferential position).

That is, in the aforementioned conventional spiral spring, the entire areas in the circumferential direction of all coil parts except in the first circumferential position are not subjected to frictional contact with other coil parts that are circumferentially adjacent, and thus are areas where elastic deformation can freely occur. Accordingly, there is a problem in that the overall natural frequency of the spiral spring is low.

When such a conventional spiral spring is used in, for example, a valve timing adjuster disclosed in patent literature 1, resonance occurs as the output rotational speed of an internal combustion engine increases and the frequency of vibrations added to the spiral spring nears the natural frequency, thus imposing a large burden on the spiral spring.

Moreover, the coil part located in the middle with respect to the radial direction comes into contact with and is compressed by the coil part that is located radially inside and the coil part that is located radially outside in the first circumferential position, thus stress is concentrated on the first circumferential position at the time of elastic deformation movement, and there is a possibility of this part being damaged.

Accordingly, a spiral spring is desired that can have an increased natural frequency and can prevent or reduce local stress concentration that occurs at the time of elastic deformation movement.

PRIOR ART DOCUMENT

Patent Document

Patent document 1: Japanese Unexamined Patent Publication No. 2010-180862.

DISCLOSURE OF THE INVENTION

The present invention has been achieved in view of the conventional art described above, and an object thereof is to provide a method for efficiently manufacturing a spiral spring capable of having an increased natural frequency and preventing or reducing local stress concentration at the time of elastic deformation movement.

In order to achieve the object, the present invention provides a manufacturing method of spiral spring with a fixed coil part serving as an end coil part and a plurality of movable coil parts being continuous with a terminal end of the fixed coil part, the fixed coil part and the plurality of movable coil parts being wound to form the spiral body in substantially the same plane, at least a first movable coil part of the plurality of movable coil parts that is in the innermost place in the radial direction does not come into contact with both the fixed coil part, which is radially adjacent on the inside, and a second movable coil part, which is radially adjacent on the outside, at the same place in the circumferential direction while coming into contact with only one of the fixed coil part and the second movable coil part in a plurality of places that are circumferentially displaced when the spiral spring is in an elasticity retaining state reached from a free length state by elastic deformation in the diameter-reducing direction. The manufacturing method of spiral spring according to the present invention includes a spiral forming step of causing an approximately linear elongated member to be conveyed toward one side in a first direction extending along the longitudinal direction of the elongated member by at least one pair of conveying rollers and also to be engaged with a pressing member that is movable in the first direction and a second direction perpendicular to both the first direction and a rotational shaft direction of the conveying rollers and is arranged in a work area on one side in the first direction of the pair of conveying rollers, to form a spiral body including the fixed coil part, the first movable coil part and the second movable coil part from the linear elongated member, and wherein the spiral forming step is configured to control the position of the pressing member with respect to the second direction, while recognizing, based on a signal from a rotational speed sensor for detecting the rotational speed of at least one of the pair of conveying rollers, a relationship between a position in the longitudinal direction of the elongated member that is engaged with the pressing member and the position in the circumferential direction after the spiral body is formed.

The manufacturing method of spiral spring according to the present invention can efficiently manufacture a spiral spring in which a first movable coil part does not come into contact with both a fixed coil part, which is radially adjacent on the inside, and a second movable coil part, which is radially adjacent on the outside, at the same place in the circumferential direction while coming into contact with only one of the fixed coil part and the second movable coil part in a plurality of places that are circumferentially displaced when the spiral spring is in an elasticity retaining state.

In one embodiment, the spiral forming step is configured to form a plurality of small curvature parts at a plurality of positions in the circumferential direction of the first movable coil part, and also form a plurality of large curvature parts at a plurality of positions of the second movable coil part that respectively correspond to the plurality of small curvature parts in the circumferential directions. The small curvature parts come into contact with the corresponding large curvature parts without coming into contact with the fixed coil part.

Preferably, the manufacturing method of spiral spring according to the present invention may further include a starting end side cutting step that is performed before the spiral forming step, cuts the elongated member by a cutting member provided in the work area so as to form the starting end of the spiral spring after the elongated member is conveyed by the pair of conveying rollers such that the tip end side of the elongated member reaches the work area, and recognizes an initial position corresponding to the starting end based on a signal obtained from the rotational speed sensor at this moment, and a terminal end side cutting step performed after the spiral forming step, and cuts off the spiral body from the elongated member by the cutting member disposed in the work area so as to form the spiral spring.

Preferably, the manufacturing method of spiral spring according to the present invention may further include an inner end side attachment hook forming step that is performed between the starting end side cutting step and the spiral forming step, and causes an inner end side attachment hook forming member disposed in the work area to act on a predetermined site that is continuous with the starting end of the elongated member to form an inner end side attachment hook, and an outer end side attachment hook forming step that is performed between the spiral forming step and the terminal end side cutting step, and causes an outer end side attachment hook forming member disposed in the work area to act on an outer end site of the spiral body formed by the spiral forming step to form an outer end side attachment hook.

In this case, the terminal end side cutting step is configured to cut a site of the spiral body on a downstream side in the conveying direction of the outer end side attachment hook.

The elongated member may have a cross-sectional shape that is an approximately rectangular shape with a pair of first sides facing each other and a pair of second sides facing each other.

In the spiral forming step, the pressing member may be engaged with one first side of the pair of first sides of the elongated member so that the radius of curvature of a site of the spiral body that is being formed by the pressing member decreases as the pressing member is moved toward the other first side from the one first side in the second direction, and the radius of curvature of the site of the spiral body that is being formed by the pressing member increases as the pressing member is moved toward the one first side from the other first side in the second direction.

In this case, in a state before the elongated member is formed into the spiral body by the pressing member, the one first side preferably has a convex shape bulging outward relative to a line connecting the corresponding ends of the pair of second sides while the other first side is along a line connecting the corresponding ends of the pair of second sides.

EMBODIMENT FOR CARRYING OUT THE INVENTION

Below, a preferable embodiment of the spiral spring manufacturing method according to the present invention is described with reference to the appended drawings.

First, the configuration of a spiral spring 1 manufactured by the manufacturing method according to the present embodiment is described.

Figure 1A:
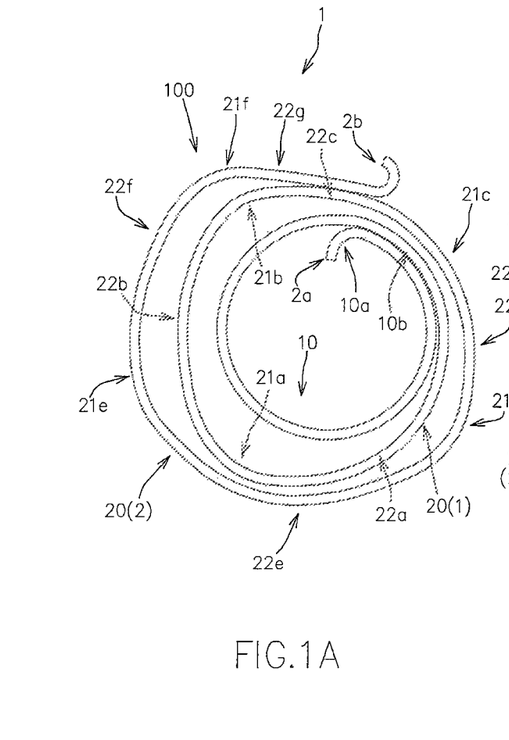
FIGS. 1A to 1C are plan views of a spiral spring formed by a manufacturing method of spiral spring according to one embodiment of the present invention, and show a free length state, an initial torque generating state and a maximum torque generating state, respectively.
Figure 1B:
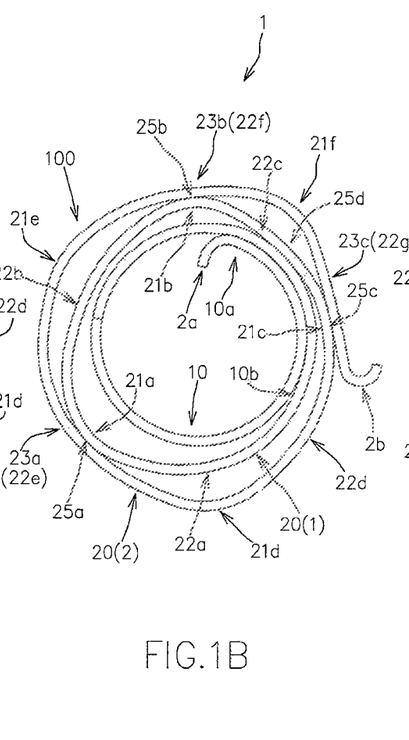
Figure 1C:
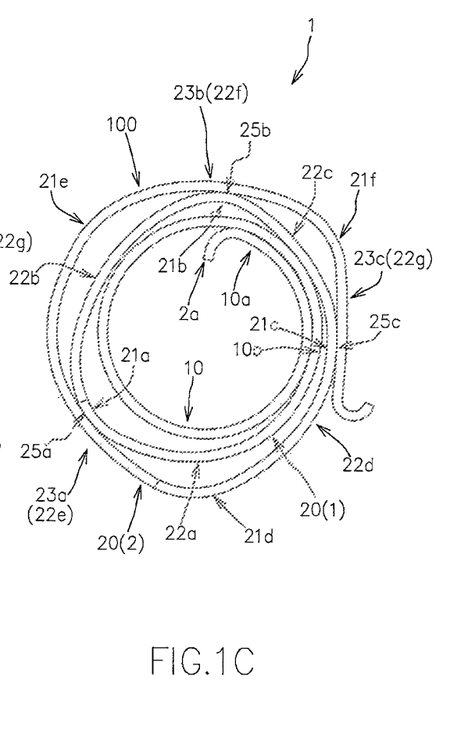

FIGS. 1A to 1C show plan views of the spiral spring 1.

FIGS. 1A to 1C show a free length state, an initial torque generating state (a state in which the spiral spring 1 is elastically deformed in the diameter-reducing direction from the free length state so as to generate a predetermined initial torque), and a maximum torque generating state (a state in which the spiral spring 1 is elastically deformed in the diameter-reducing direction from the initial torque generating state so as to generate the maximum torque) of the spiral spring 1, respectively.

As shown in FIGS. 1A to 1C, due to the spiral winding of an elongated member 100 in substantially the same plane, the spiral spring 1 has a fixed coil part 10 that is in the innermost place in the radial direction and serves as an end coil part, and a plurality of movable coil parts 20 that are continuous with the terminal end of the fixed coil part 10.

The fixed coil part 10 has one end 10a on the starting end side that forms the inner end of the spiral spring 1 and the other end 10b that spirally extends from the one end 10a and forms the terminal end that continues to the movable coil parts 20.

In the configuration depicted in the drawings, the area covering approximately 1.25 turns from the inner end of the spiral spring 1 serves as the fixed coil part 10.

At the inner end of the spiral spring 1 (the starting end of the fixed coil part), an inner end side attachment hook 2a is formed.

The plurality of movable coil parts 20 have a first movable coil part 20(1) that extends from the terminal end 10b of the fixed coil part 10 so as to be located radially outside of the fixed coil part 10, and a second movable coil part 20(2) that extends from the terminal end of the first movable coil part 20(1) so as to be located radially outside of the first movable coil part 20(1).

As shown in FIGS. 1A to 1C, in the spiral spring 1, the terminal end of the second movable coil part 20(2) forms the outer end of the spiral spring 1, and an outer end side attachment hook 2b is formed at the outer end (the terminal end of the second movable coil part 20(2)).

In the present embodiment, a case where the spiral spring 1 having two movable coil parts is manufactured is described as an example, but, naturally, the present invention is not limited to this embodiment, and is applicable when manufacturing a spiral spring having three or more movable coil parts.

The spiral spring 1 is configured such that when an elasticity retaining state (the state shown in FIGS. 1B and 1C) is reached from a free length state (the state shown in FIG. 1A) by elastic deformation in the diameter-reducing direction, the first movable coil part 20(1) does not come into contact with both the fixed coil part 10, which is radially adjacent on the inside, and the second movable coil part 20(2), which is radially adjacent on the outside, at the same place in the circumferential direction, and comes into contact with only one of the fixed coil part 10 and the second movable coil part 20(2) in a plurality of places that are circumferentially displaced.

Specifically, as shown in FIGS. 1B and 1C, in the elasticity retaining state, the first movable coil part 20(1) is in contact with only the second movable coil part 20(2) in a first place 25a that is spaced from the starting end at a predetermined angle in the circumferentially outward direction while being radially spaced from the fixed coil part 10, is in contact with only the second movable coil part 20(2) in a second place 25b that is spaced from the first place 25a at a predetermined angle in the circumferentially outward direction while being radially spaced from the fixed coil part 10, and is in contact with only the second movable coil part 20(2) in a third place 25c that is spaced from the second place 25b at a predetermined angle in the circumferentially outward direction while being radially spaced from the fixed coil part 10.

When the spiral spring 1 is in the elasticity retaining state, the first movable coil part 20(1) is, further, in contact with only the fixed coil part 10 in a fourth place 25d that is between the second place 25b and the third place 25c with respect to the circumferential direction while being radially spaced from the second movable coil part 20(2).

Thus, in the spiral spring 1, in the elasticity retaining state, the first movable coil part 20(1) is not in contact with both the fixed coil part 10 and the second movable coil part 20(2) in the same place in the circumferential direction, and is in contact with only one of the fixed coil part 10 and the second movable coil part 20(2) in a plurality of places that are circumferentially displaced.

The spiral spring 1 with this configuration can have a higher natural frequency than conventional spiral springs, and, moreover, can effectively prevent local stress concentration.

FIGS. 9A to 9C show plan views of a conventional spiral spring 200 in a free length state, an initial torque generating state, and a maximum torque generating state, respectively.

Figure 10:
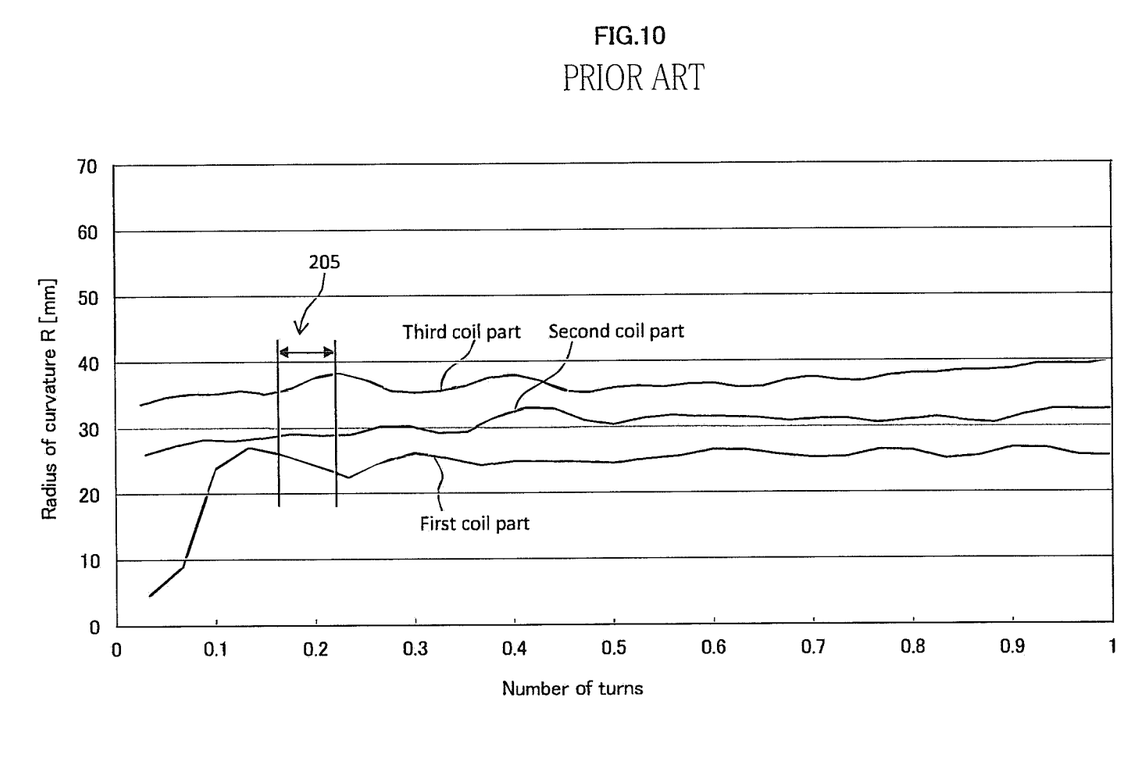
FIG. 10 is a graph showing a relationship between the number of turns and the curvature of the conventional spiral spring shown in FIGS. 9A to 9C at the initial torque generating state.

FIG. 10 shows the relationship between the number of turns and the curvature when the conventional spiral spring 200 is in an initial torque generating state (FIG. 9B).

Figure 11:
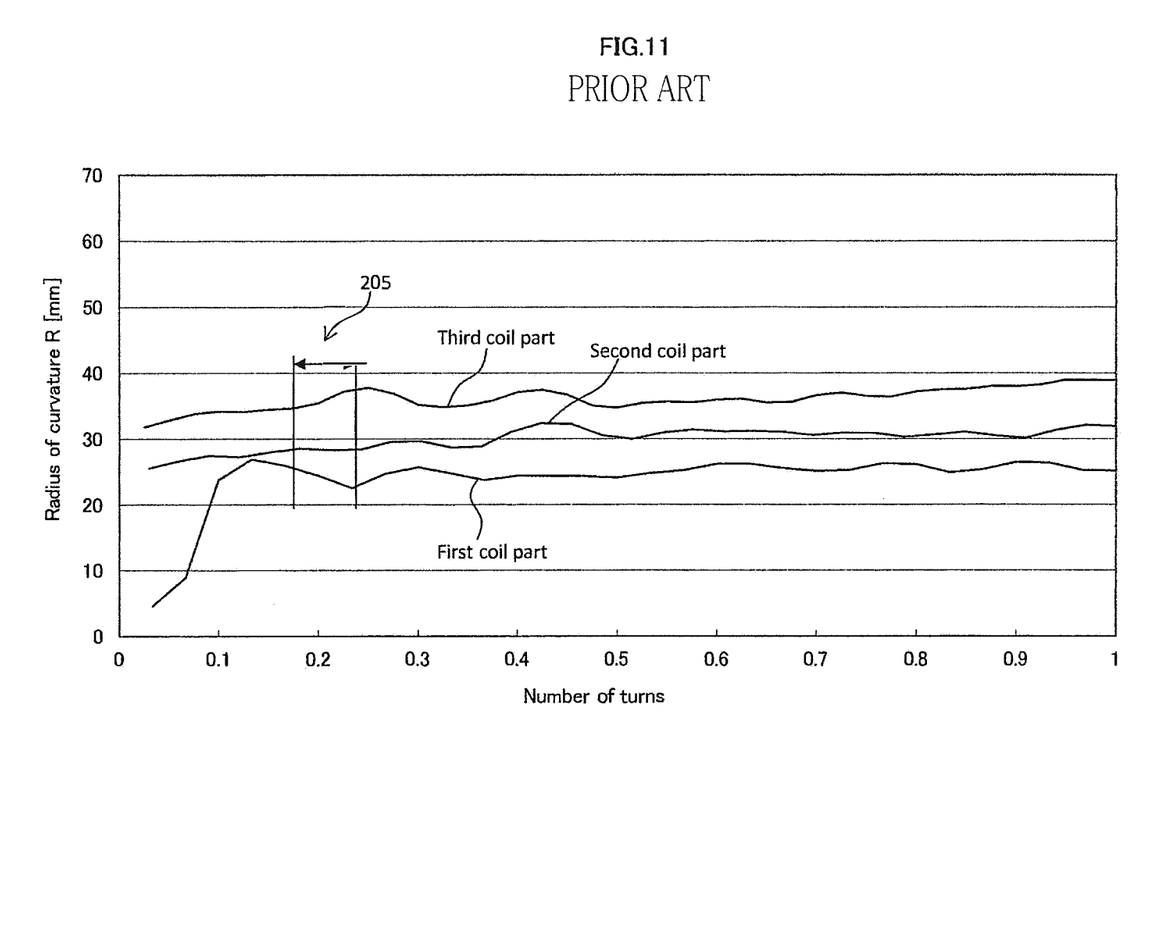
FIG. 11 is a graph showing a relationship between the number of turns and the curvature of the conventional spiral spring shown in FIGS. 9A to 9C at the maximum torque generating state.

FIG. 11 shows the relationship between the number of turns and the curvature when the conventional spiral spring 200 is in a maximum torque generating state (FIG. 9C).

As shown in FIG. 9A, in a free length state, the conventional spiral spring 200 is configured such that the radius of curvature is increased at an approximately constant rate from the inner end that is located radially inside toward the outer end that is located radially outside (the radius is increased at an approximately constant rate).

As shown in FIGS. 9B and 9C, when the conventional spiral spring 200 having this configuration is brought into an elasticity retaining state such as the initial torque generating state or the maximum torque generating state, all coil parts ranging from a first coil part 210(1) in the innermost place to a third coil part 210(3) in the outermost place in the radial direction come into contact with other radially adjacent coil parts only in one location that is approximately the same position with respect to the circumferential direction (hereinafter referred to as a first circumferential position 205).

In this case, in every one of all coil parts, the entire area in the circumferential direction except at the first circumferential position 205 is not subjected to frictional contact with other radially adjacent coil parts, and thus is an area where elastic deformation can freely occur. Accordingly, the overall natural frequency of the spiral spring is lowered, and resonance is likely to occur.

Moreover, in the conventional configuration, the coil part located in the middle with respect to the radial direction (the second coil part 210(2) in the configuration depicted in the drawings) is compressed by the coil part (210(1)) located radially inside and the coil part (210(3)) located radially outside in the first circumferential position 205, and thus there is a problem in that stress is concentrated on the first circumferential position 205 at the time of elastic deformation movement.

On the other hand, in the spiral spring 1, the first movable coil part 20(1) contact only one of the fixed coil part 10 and the second movable coil part 20(2) in a plurality of places 25a, 25b, and 25c that are circumferentially displaced. Accordingly, it is possible to increase the natural frequency and thus effectively prevent resonance.

Moreover, the first movable coil part 20(1) is configured so as not to be simultaneously in contact with both the fixed coil part and the second movable coil part in the same place in the circumferential direction. Accordingly, it is possible to effectively prevent stress concentration on a specific location at the time of elastic deformation movement.

Figure 2:
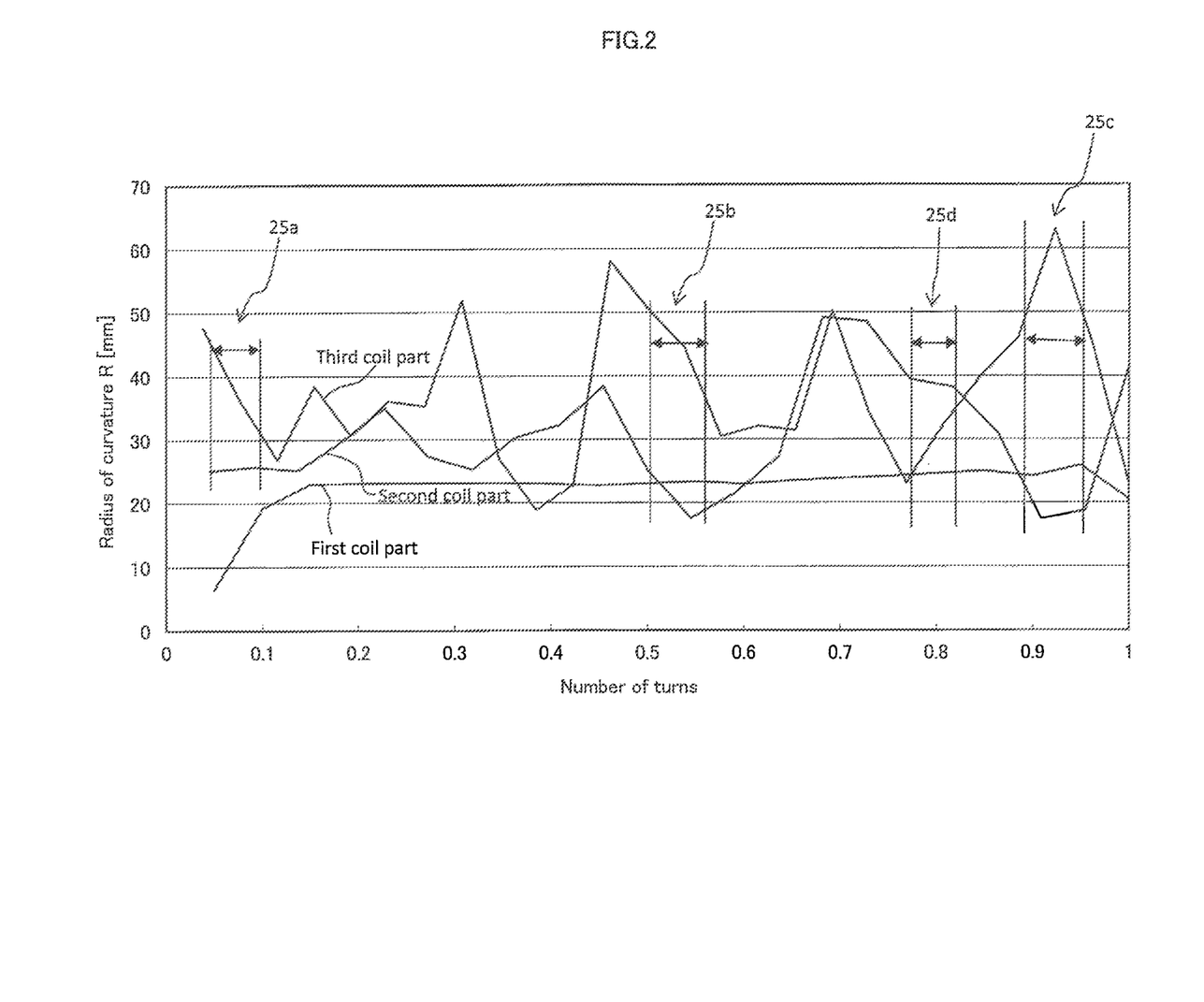
FIG. 2 is a graph showing a relationship between the number of turns and the curvature when the spiral spring shown in FIGS. 1A to 1C is in an initial torque generating state.
Figure 3:
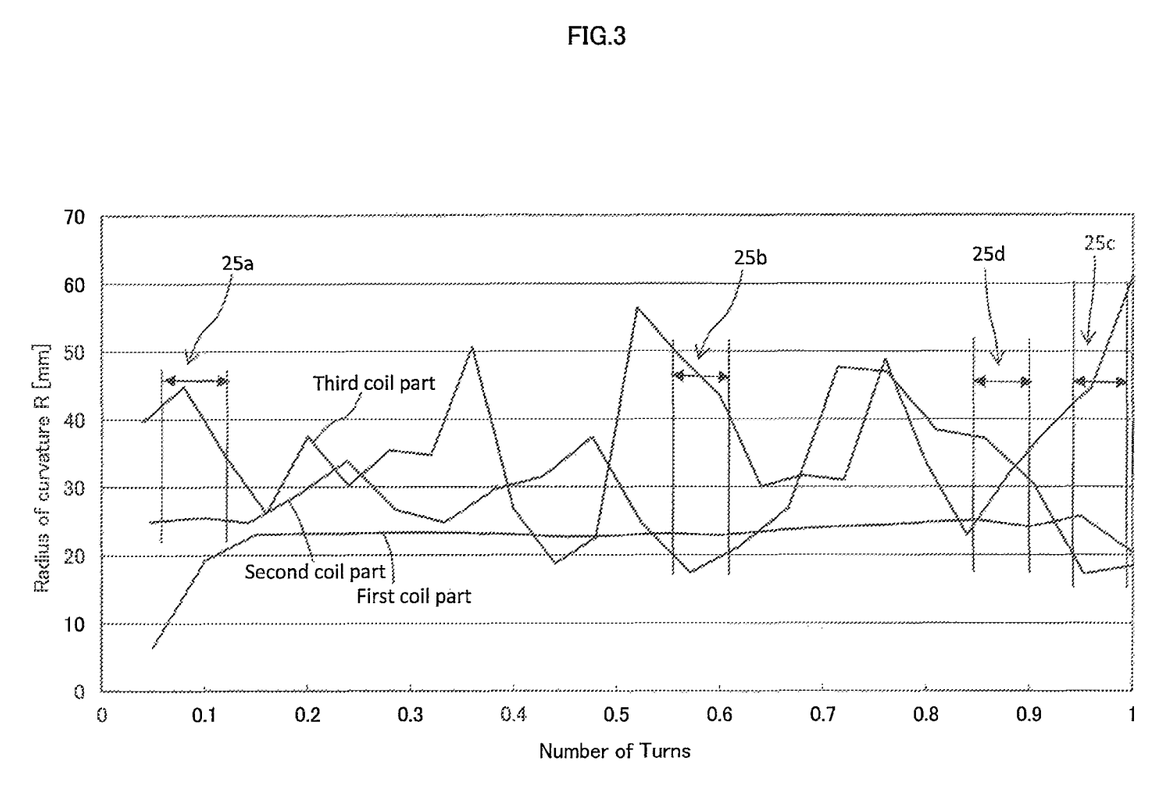
FIG. 3 is a graph showing a relationship between the number of turns and the curvature when the spiral spring shown in FIGS. 1A to 1C is in a maximum torque generating state.

FIGS. 2 and 3 show the relationship between the number of turns and the curvature when the spiral spring 1 is in an initial torque generating state (FIG. 1B) and a maximum torque generating state (FIG. 1C), respectively.

As shown in FIGS. 1A to 1C and FIGS. 2 and 3, the first movable coil part 20(1) has a plurality of small curvature parts with a smaller radius of curvature than both sides in the circumferential direction.

In the configuration depicted in the drawings, the plurality of small curvature parts include first to third small curvature parts 21a to 21c.

The first small curvature part 21a is provided in a place circumferentially spaced from the terminal end 10b of the fixed coil part 10.

The second small curvature part 21b is provided in a place circumferentially spaced from the first small curvature part 21a.

The third small curvature part 21c is provided in a place circumferentially spaced from the second small curvature part 21b.

As shown in FIGS. 1A to 1C and FIGS. 2 and 3, in the spiral spring 1, a first transitional area 22a and a second transitional area 22b having a larger radius of curvature than the first small curvature part 21a are provided on the starting end side and the terminal end side in the circumferential direction relative to the first small curvature part 21a, respectively.

That is, the first small curvature part 21a is located between the first and second transitional areas 22a and 22b with respect to the circumferential direction.

The second small curvature part 21b is located on the terminal end side in the circumferential direction of the second transitional area 22b, and the spiral spring 1 further includes a third transitional area 22c having a larger radius of curvature than the second small curvature part 21b on the terminal end side in the circumferential direction relative to the second small curvature part 21b.

That is, the second small curvature part 21b is located between the second and third transitional areas 22b and 22c with respect to the circumferential direction.

The third small curvature part 21c is located on the terminal end side in the circumferential direction of the third transitional area 22c, and the spiral spring 1 further includes a fourth transitional area 22d having a larger radius of curvature than the third small curvature part 21c on the terminal end side in the circumferential direction relative to the third small curvature part 21c.

That is, the third small curvature part 21c is located between the third and fourth transitional areas 22c and 22d with respect to the circumferential direction.

On the other hand, the second movable coil part 20(2) includes first to third large curvature parts 23a to 23c in places respectively corresponding to the first to third small curvature parts 21a to 21c with respect to the circumferential direction, and the first to third large curvature parts 23a to 23c each have a larger radius of curvature than both sides in the circumferential direction.

In this configuration, the first to third small curvature parts 21a to 21c comes into contact with the corresponding first to third large curvature parts 23a to 23c, respectively.

Specifically, the first small curvature part 21a comes into contact with the first large curvature part 23a while leaving a gap between the first small curvature part 21a and the fixed coil part 10, the second small curvature part 21b comes into contact with the second large curvature part 23b while leaving a gap between the second small curvature part 21b and the fixed coil part 10, and the third small curvature part 21c comes into contact with the third large curvature part 23c while leaving a gap between the third small curvature part 21c and the fixed coil part 10.

As shown in FIGS. 1A to 1C, the spiral spring 1 includes, on the terminal end side in the circumferential direction relative to the fourth transitional area 22d, a fourth small curvature part 21d having a smaller curvature than the fourth transitional area 22d, a fifth transitional area 22e having a larger curvature than the fourth small curvature part 21d, a fifth small curvature part 21e having a smaller curvature than the fifth transitional area 22e, a sixth transitional area 22f having a larger curvature than the fifth small curvature part 21e, a sixth small curvature part 21f having a smaller curvature than the sixth transitional area 22f, and a seventh transitional area 22g having a larger curvature than the sixth small curvature part 21f, in this order.

In this configuration, the fifth to seventh transitional areas 22e to 22g serve as the first to third large curvature parts 23a to 23c, respectively.

As shown in FIGS. 1B and 1C, with the spiral spring 1 being in the elasticity retaining state, a portion of the first movable coil part 20(1) halfway between the second and third small curvature parts 21b and 21c with respect to the circumferential direction is in contact with the fixed coil part 10 while leaving a gap between this portion and the second movable coil part 20(2), and thereby the natural frequency is further increased.

Next, a manufacturing method according to the present embodiment for manufacturing the spiral spring 1 is described.

FIGS. 4A and 4B, FIGS. 5A and 5B, FIGS. 6A and 6B, and FIGS. 7A and 7B show schematic diagrams of steps in the manufacturing method.

Figure 6A:
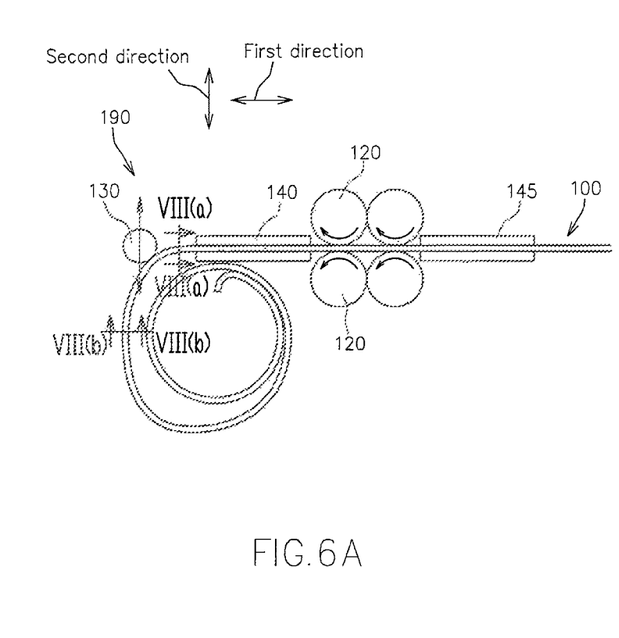
FIGS. 6A and 6B are schematic diagrams of steps in the manufacturing method of spiral spring according to one embodiment of the present invention, and shows a part of a spiral forming step and a part of an outer end side attachment hook forming step, respectively.

The manufacturing method comprises a spiral forming step of causing the approximately linear elongated member 100 to be engaged with a pressing member 130 that is capable of changing its position, while conveying the elongated member 100 toward one side in a first direction extending along the longitudinal direction by at least one pair of conveying rollers 120, to form a spiral body comprising the fixed coil part 10, the first movable coil part 20(1), and the second movable coil part 20(2) from the linear elongated member 100 (FIG. 6A).

As shown in FIG. 6A, the pressing member 130 is configured to be movable in a second direction that is perpendicular to both the first direction and the rotational shaft direction of the conveying rollers 120.

The pressing member 130 is disposed so as to be engaged with one side in the second direction of the elongated member 100 in a work area 190 that is located more toward the one side in the first direction than the pair of conveying rollers 120 are, and is configured to be capable of changing the radius of curvature of the spiral body by changing the position of the pressing member 130 in the second direction.

The pressing member 130 may take various forms as long as it can change the linear elongated member 100 into a spiral shape. For example, the pressing member 130 may have a pin-like member that is capable of changing its position in the second direction while being in parallel with the rotational shaft and a roller member that is supported on the pin-like member in a relatively rotatable manner. Due to this configuration, scratches or the like on the surface can be effectively prevented when changing the elongated member 100 from a linear shape into a spiral shape.

Specifically, at least one of the pair of conveying rollers 120 includes a rotational speed sensor (not shown) for detecting the rotational speed.

The spiral forming step is configured to control the position of the pressing member 130 with respect to the second direction, while recognizing what part of the spiral body the part of the elongated member 100 currently engaged with the pressing member 130 will constitute after the spiral body is formed (that is, while recognizing in which coil part of the spiral body said part of the elongated member 100 will be located and where said part of the elongated member 100 will be located in this coil part with respect to the circumferential direction) based on a signal from the rotational speed sensor.

Here, as described above, the pressing member 130 is disposed so as to be engaged with one side of the elongated member 100 with respect to the second direction (that is, the side that will face radially outward after the elongated member 100 is formed into a spiral shape) (see FIG. 6A), the radius of curvature of the spiral body decreases as the pressing member 130 is moved toward the other side in the second direction, and the radius of curvature of the spiral body increases as the pressing member 130 is moved toward the one side in the second direction.

Preferably, guides 140 for guiding the elongated member 100 toward the work area 190 are provided on the downstream side in the conveying direction of the conveying rollers 120 (the one side in the first direction).

In the present embodiment, guides 145 for stably guiding the elongated member 100 to the conveying rollers 120 are also provided on the upstream side in the conveying direction of the conveying rollers 120 (the other side in the first direction).

The manufacturing method according to the present embodiment further comprises a starting end side cutting step performed before the spiral forming step and a terminal end side cutting step performed after the spiral forming step.

Figure 4A:
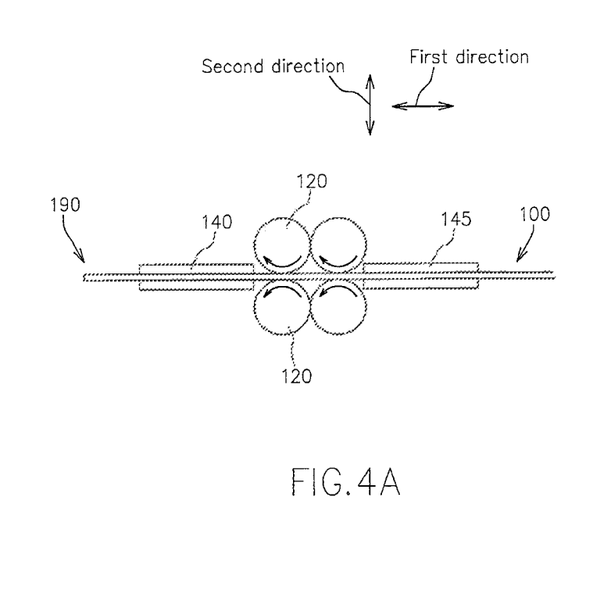
FIGS. 4A and 4B are schematic diagrams of steps in the manufacturing method of spiral spring according to one embodiment of the present invention, and show a state in which an elongated member that is a raw material for the spiral spring is conveyed and a starting end side cutting step, respectively.
Figure 4B:
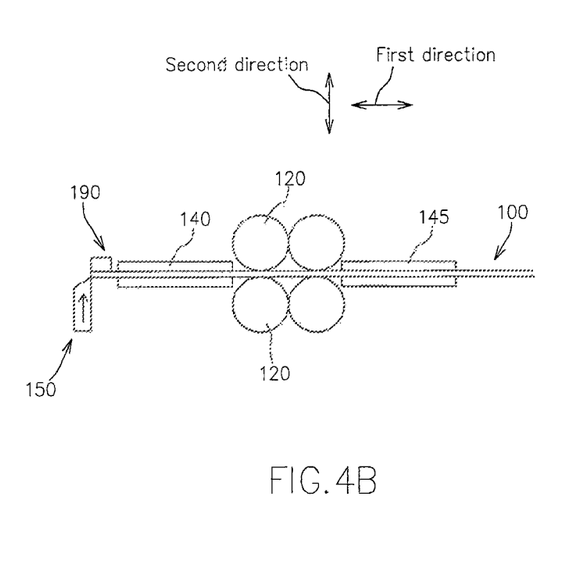

The starting end side cutting step is configured to cut, after the elongated member 100 is conveyed by the pair of conveying rollers 120 such that the tip end side of the elongated member 100 reaches the work area 190 (FIG. 4A), the elongated member 100 by a cutting member 150 provided in the work area 190 so as to form the starting end of the spiral spring (FIG. 4B).

It is possible to recognize an initial position corresponding to the starting end based on a signal from the rotational speed sensor obtained when the elongated member 100 is cut by the cutting member 150.

Figure 7A:
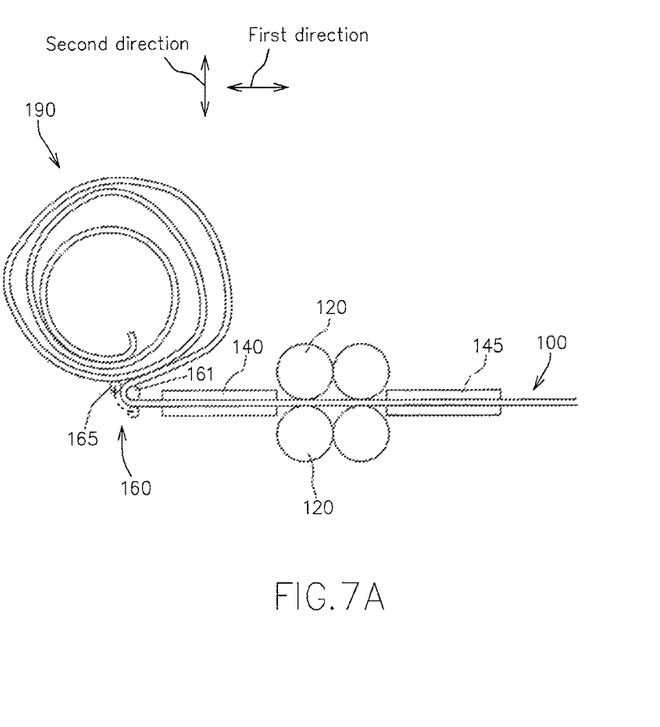
FIGS. 7A and 7B are schematic diagrams of steps in the manufacturing method of spiral spring according to one embodiment of the present invention, and shows a part of the outer end side attachment hook forming step and a terminal end side cutting step, respectively.
Figure 7B:
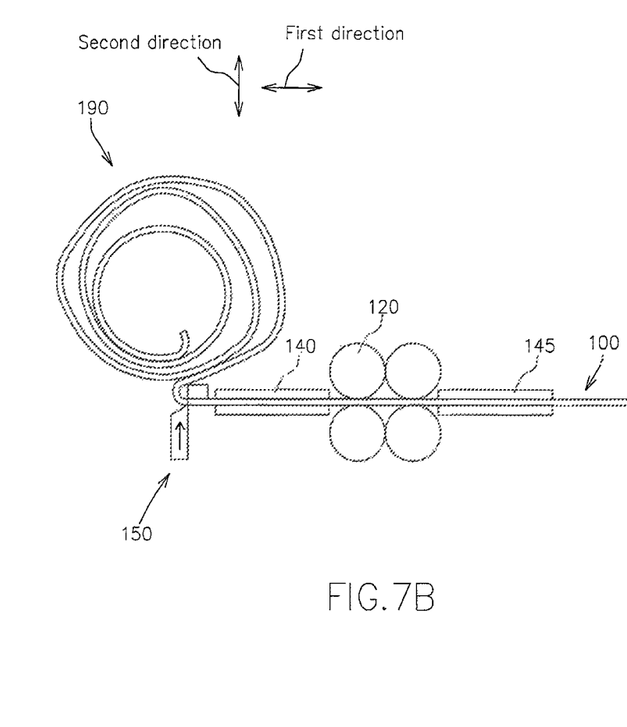

The terminal side cutting step is configured to cut off the spiral body from the elongated member 100 by the cutting member 150 disposed in the work area 190 (FIG. 7B).

In the case of continuously manufacturing a plurality of spiral springs 1 from the elongated member 100, the terminal end side cutting step performed when manufacturing one spiral spring 1 can be used as the starting end side cutting step performed when manufacturing the next spiral spring 1.

Naturally, it is possible, instead of this, to configure the terminal end side cutting step performed when manufacturing one spiral spring 1 and the starting end side cutting step performed when manufacturing the next spiral spring 1 to be separate procedures.

As described above, the spiral spring 1 has the inner end side attachment hook 2a at the inner end (the starting end 10a of the fixed coil part 10) and the outer end side attachment hook 2b at the outer end (the terminal end of the movable coil part 20(2) in the outermost place).

Figure 5A:
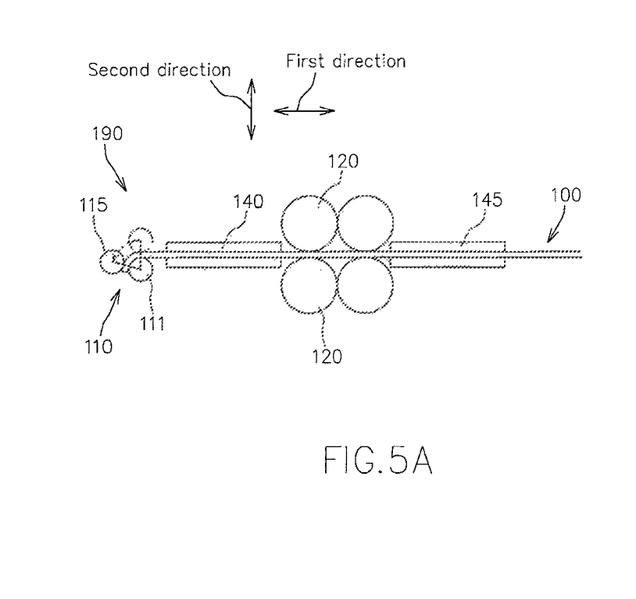
FIGS. 5A and 5B are schematic diagrams of steps in the manufacturing method of spiral spring according to one embodiment of the present invention, and show an inner end side attachment hook forming step and a part of a spiral forming step, respectively.
Figure 5B:
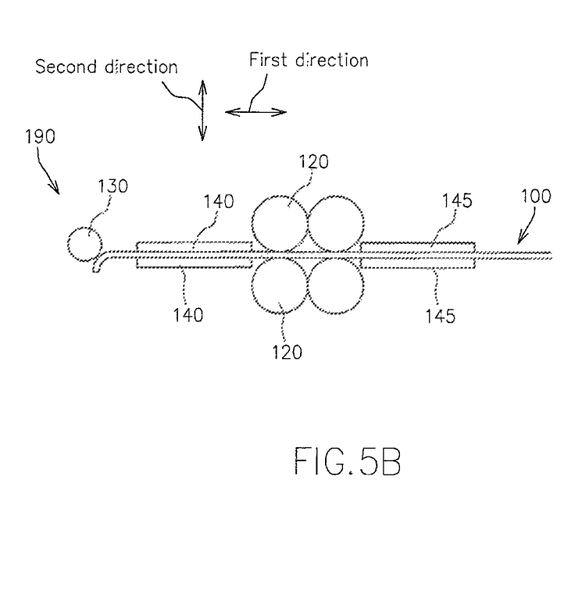
Figure 6B:
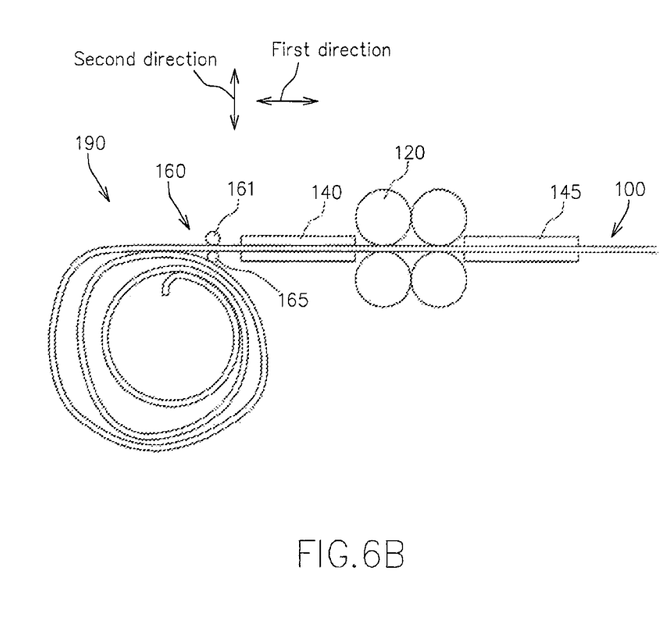

Accordingly, the manufacturing method further comprises an inner end side attachment hook forming step (FIG. 5A) and an outer end side attachment hook forming step (FIGS. 6B and 7A).

The inner end side attachment hook forming step is configured to be performed between the starting end side cutting step (FIG. 4B) and the spiral forming step (FIGS. 5B and 6A) and cause an inner end side attachment hook forming member 110 disposed in the work area 190 to act on a predetermined site that is continuous with the starting end 10a of the elongated member 100 to form the inner end side attachment hook 2a.

Specifically, as shown in FIG. 5A, the inner end side attachment hook forming member has a fixed pin 111 for a hook for engagement with a side of the elongated member 100 that will face radially inward after the spiral body is formed and a movable pin 115 for a hook for engagement with a side of the elongated member 100 that will face radially outward after the spiral body is formed.

The hook movable pin 115 is moved around the hook fixed pin 111, with the tip end of the elongated member 100 being held between the hook movable pin 115 and the hook fixed pin 111, and thereby, the inner end side attachment hook 2a is formed.

The outer end side attachment hook forming step is configured to be performed between the spiral forming step (FIGS. 5B and 6A) and the terminal end side cutting step (FIG. 7B) and cause an outer end side attachment hook forming member 160 disposed in the work area 190 to act on the outer end site of the spiral body formed by the spiral forming step to form the outer end side attachment hook 2b.

Specifically, as shown in FIGS. 6B) and 7A, the outer end side attachment hook forming member 160 has a fixed pin 161 for a hook for engagement with a side of the spiral body that will face radially outward and a movable pin 165 for a hook for engagement with a side of the spiral body that will face radially inward.

The hook movable pin 165 is moved around the hook fixed pin 161, with the elongated member 100 that forms the spiral body being held between the hook movable pin 165 and the hook fixed pin 161, and thereby, the outer end side attachment hook 2a is formed.

The manufacturing method according to the present embodiment is suitably carried out by using, for example, a manufacturing apparatus including:

actuators (not shown) that respectively cause the conveying rollers 120, the pressing member 130, the cutting member 150, the inner end side attachment hook forming member 110, and the outer end side attachment hook forming member to operate; and a control unit (not shown) that accommodates operational programs for the actuators and performs operational control on each actuator based on the operational programs in accordance with a signal from the rotational speed sensor.

Figure 8A:
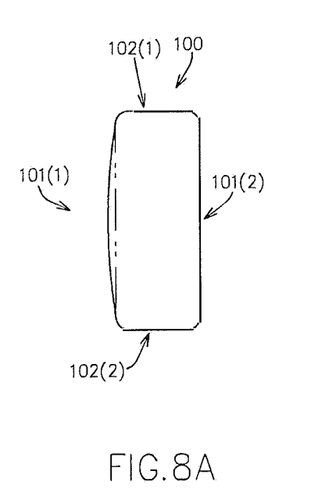
FIGS. 8A and 8B are cross-sectional views taken along the lines VIII(a)-VIII(a) and VIII(b)-VIII(b) in FIG. 6A.
Figure 8B:
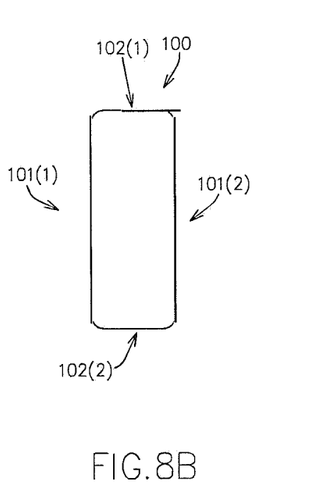

FIGS. 8A and 8B show cross-sectional views taken along the lines VIII(a)-VIII(a) and VIII(b)-VIII(b) in FIG. 6A, respectively.

As shown in FIG. 8A, the elongated member 100 has a cross-sectional shape that is an approximately rectangular shape with a pair of first sides 101(1) and 101(2) facing each other and a pair of second sides 102(1) facing each other.

As shown in FIG. 8A, in the manufacturing method according to the present embodiment, the elongated member 100 in an initial state before being formed into a spiral body by the pressing member 130 has the side 101(2) of the pair of first sides that overlaps a line connecting the corresponding ends of the pair of second sides 102(1) and 102(2) (the side facing radially inward when a spiral body is formed) and the side 101(1) of the pair of first sides that has a convex shape bulging outward relative to a line (the dashed double-dotted line in FIG. 8A) connecting the corresponding ends of the pair of second sides 102(1) and 102(2) (the side engaged with the pressing member 130 and facing radially outward when a spiral body is formed).

According to this configuration, it is possible for the elongated member 100 to have an approximately rectangular cross-sectional shape (see FIG. 8B) after the elongated member 100 is formed into a spiral body from a linear shape by the pressing member 130.

That is, when a spiral body is formed from the linear elongated member 100 by the pressing member 130, the side of the elongated member 100 engaged with the pressing member 130 (that is, the side that will face radially outward after the spiral body is formed) is pressed by the pressing member 130 and thinned.

Figure 8C:
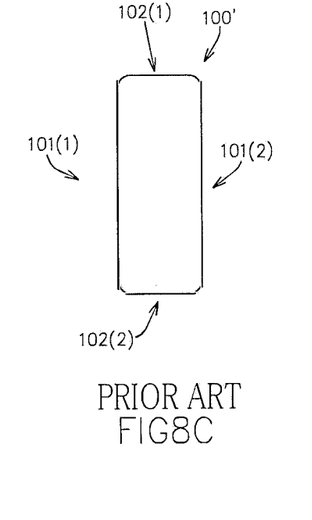
FIGS. 8C and 8D are cross-sectional views of a conventional spiral spring that are correspond to FIGS. 8A and 8B, respectively.
Figure 8D:
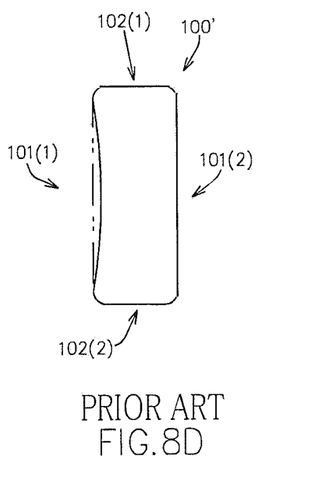

For example, if an elongated member 100' as shown in FIG. 8C) that has an approximately rectangular cross-sectional shape in an initial state before being formed into the spiral body by the pressing member 130 is used, the side 101(1) that will face radially outward will be depressed into a concave shape as shown in FIG. 8D) after the formation of the spiral body by the pressing member 130.

In the present embodiment on the other hand, as described above, the elongated member 100 in an initial state before being formed into the spiral body by the pressing member 130 has the side 101(1) of the pair of first sides that has a convex shape bulging outward relative to a line connecting the corresponding ends of the pair of second sides 102(1) and 102(2) (the side that will face radially outward after the spiral body is formed) (see FIG. 8A).

According to this configuration, it is possible for the elongated member 100 to have an approximately rectangular cross-sectional shape as shown in FIG. 8B) after the elongated member 100 is formed into a spiral body from a linear shape by the pressing member 130.

Accordingly, it is possible to effectively ensure the area of contact of radially adjacent coil parts.

DESCRIPTION OF THE REFERENCE NUMERALS 1 spiral spring
2a inner end side attachment hook
2b outer end side attachment hook
10 fixed coil part
20(1) first movable coil part
20(2) second movable coil part
21a to 21c first to third small curvature parts
23a to 23c first to third large curvature parts
100 elongated member
101(1), 101(2) a pair of first sides
102(1), 102(2) a pair of second sides
120 conveying roller
130 pressing member
150 cutting member

What is claimed is:

1. A manufacturing method of a spiral spring with a fixed coil part serving as an end coil part and a plurality of movable coil parts being continuous with a terminal end of the fixed coil part, the fixed coil part and the plurality of movable coil parts being wound to form a spiral body in substantially the same plane, at least a first movable coil part of the plurality of movable coil parts that is in an innermost place in the radial direction does not come into contact with both the fixed coil part, which is radially adjacent on an inside, and a second movable coil part, which is radially adjacent on an outside, at a same place in a circumferential direction while coming into contact with only one of the fixed coil part and the second movable coil part in a plurality of places that are circumferentially displaced when the spiral spring is in an elasticity retaining state reached from a free length state by elastic deformation in the diameter-reducing direction, the manufacturing method of spiral spring comprising, (a) a spiral forming step of causing an approximately linear elongated member to be conveyed toward one side in a first direction extending along the longitudinal direction of the elongated member by at least one pair of conveying rollers and also to be engaged with a pressing member that is movable in the first direction and a second direction perpendicular to both the first direction and a rotational shaft direction of the conveying rollers and is arranged in a work area on one side in the first direction of the pair of conveying rollers, to form a spiral body including the fixed coil part, the first movable coil part and the second movable coil part from the linear elongated member, (b) wherein the spiral forming step is configured to control the position of the pressing member with respect to the second direction, while recognizing, based on a signal from a rotational speed sensor for detecting the rotational speed of at least one of the pair of conveying rollers, a relationship between a position in the longitudinal direction of the elongated member that is engaged with the pressing member and the position in the circumferential direction after the spiral body is formed, (c) wherein the spiral forming step is configured to form a plurality of small curvature parts at a plurality of positions in the circumferential direction of the first movable coil part, and also form a plurality of large curvature parts at a plurality of positions of the second movable coil part that respectively correspond to the plurality of small curvature parts in the circumferential directions, and (d) wherein the small curvature parts come into contact with the corresponding large curvature parts without coming into contact with the fixed coil part.

2. The manufacturing method of spiral spring according to claim 1, further comprising, (a) a starting end side cutting step that is performed before the spiral forming step, cuts the elongated member by a cutting member provided in the work area so as to form the starting end of the spiral spring after the elongated member is conveyed by the pair of conveying rollers such that a tip end side of the elongated member reaches the work area, and recognizes an initial position corresponding to the starting end based on a signal obtained from the rotational speed sensor at a moment, and (b) a terminal end side cutting step performed after the spiral forming step, and cuts off the spiral body from the elongated member by the cutting member disposed in the work area so as to form the spiral spring.

3. The manufacturing method of spiral spring according to claim 2, further comprising.

4. The manufacturing method of spiral spring according to claim 3.

\* \* \* \* \*

UNITED STATES PATENT AND TRADEMARK OFFICE
CERTIFICATE OF CORRECTION

| | | |
|---|---|---|
| PATENT NO. | : 9,782,819 B2 | Page 1 of 1 |
| APPLICATION NO. | : 14/436794 | |
| DATED | : October 10, 2017 | |
| INVENTOR(S) | : Kishihara et al. | |

It is certified that error appears in the above-identified patent and that said Letters Patent is hereby corrected as shown below:

In Column 12, Claim 1, Lines 35-36, "comprising," should be -- comprising: -- therefor.

In Column 13, Claim 2, Line 5, "comprising," should be -- comprising: -- therefor.

In Column 13, Claim 3, Line 2, delete "comprising." should be -- comprising:
(a) an inner end side attachment hook forming step that is performed between the starting end side cutting step and the spiral forming step, and causes an inner end side attachment hook forming member disposed in the work area to act on a predetermined site that is continuous with the starting end of the elongated member to form an inner end side attachment hook,
(b) an outer end side attachment hook forming step that is performed between the spiral forming step and the terminal end side cutting step, and causes an outer end side attachment hook forming member disposed in the work area to act on an outer end site of the spiral body formed by the spiral forming step to form an outer end side attachment hook, and
(c) wherein the terminal end side cutting step cuts a site of the spiral body on a downstream side in the conveying direction of the outer end side attachment hook. -- therefor.

In Column 13, Claim 4, Line 2, delete "claim 3." and insert -- claim 3,
(a) wherein the elongated member has a cross-sectional shape that is an approximately rectangular shape with a pair of first sides facing each other and a pair of second sides facing each other,
(b) wherein, in the spiral forming step, the pressing member is engaged with one first side of the pair of first sides of the elongated member so that the radius of curvature of a site of the spiral body that is being formed by the pressing member decreases as the pressing member is moved toward the other first side from the one first side in the second direction, and the radius of curvature of the site of the spiral body that is being formed by the pressing member increases as the pressing member is moved toward the one first side from the other first side in the second direction, and
(c) wherein, in a state before the elongated member is formed into the spiral body by the pressing member, the one first side has a convex shape bulging outward relative to a line connecting the corresponding ends of the pair of second sides while the other first side is along a line connecting the corresponding ends of the pair of second sides. -- therefor.

Signed and Sealed this
Tenth Day of July, 2018

Andrei Iancu
*Director of the United States Patent and Trademark Office*